Patented July 23, 1929.

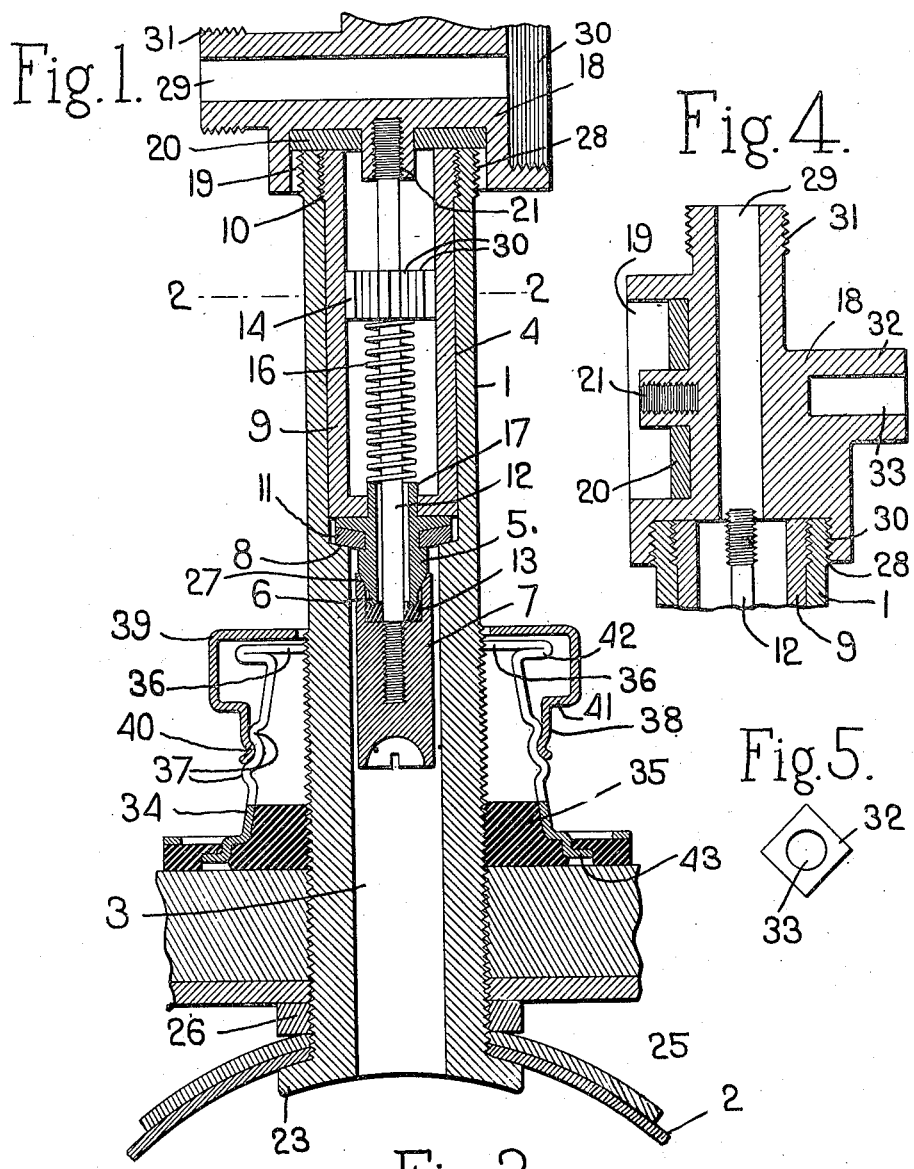

1,721,771

UNITED STATES PATENT OFFICE.

WALTER E. COPITHORN, OF NATICK, MASSACHUSETTS.

TIRE VALVE.

Application filed April 5, 1926. Serial No. 99,701.

This invention relates to tire valves and has for one of its objects to provide an improved valve having a double closure or valves with means for locking both closures or valves firmly to their seat.

In order to give an understanding of the invention I have illustrated in the drawing some selected embodiments thereof which will now be described after which the novel features will be pointed out in the appended claim.

Fig. 1 is a sectional view on an enlarged scale of the valve, the upper portion of the cap being broken away;

Fig. 2 is a section on the line 2—2, Fig. 1;

Fig. 3 is an under side view of the valve;

Fig. 4 is a sectional view similar to Fig. 1 of the upper end of the construction with the cap in inflating position.

Fig. 5 is a plan view of the cap projections.

In the drawings 1 indicates the valve casing of my improved tire valve which is connected to the inner tube 2 by a novel means hereinafter described. This valve casing is provided with a central bore 3 which is enlarged at its outer end as shown at 4.

The valve structure which is situated within the valve casing comprises a valve seat member 5 having a valve seat 6 at its inner end and a valve 7 adapted to seat against the valve seat 6. The valve seat member 5 fits with a tight joint against a shoulder 8 formed in the interior of the valve casing 1 and is held clamped against the shoulder by means of a clamping sleeve 9 which is screw-threaded into the bore 4 as shown at 10. A suitable packing washer 11 will be employed for making a tight joint between the valve seat member 5 and seat 8.

The valve 7 is made of metal and it has a valve stem 12 screw threaded thereto. Said valve is provided at its outer end with a recess in the bottom of which is received a resilient washer 13 that engages the valve seat 6 and co-operates therewith to prevent leakage of air from the tire. The walls of the recess are flared or bevelled at the outer end as shown at 27. The valve stem 12 extends through the valve seat member 5 and through the sleeve 9. Said stem has the squared portion 14 thereon and the clamping sleeve 9 is provided with a square bore to receive the square portion 14. The purpose of this is to prevent the valve stem from turning as will be presently described. The squared portion 14 is formed with grooves 30 to permit the passage of air when the tire is inflated.

16 is a spring which encircles the valve stem and engages the valve seat member at one end and at the other end engages the squared portion 14, said spring serving normally to hold the valve yieldingly against the seat 6 but to allow the valve to move away from the seat when the tire is being inflated. The valve seat member is shown as having a flange 17 which enters an opening in the bottom of the clamping sleeve 9 and serves to assist in retaining the parts in their proper relation.

The cap 18 is adapted to close the end of the valve casing 1 and to engage the valve stem 12 and positively seat the valve against the valve seat 6. This cap has a recess 19 adapted to receive the end of the valve casing with a resilient washer 20 to seat against the end of the valve casing, and an interior screw-threaded bore 21 which engages with the screw threads on the end of the valve stem 12. When the cap is applied and rotated, therefore, the valve 7 will be drawn firmly against the seat 6 thus making a tight joint and in this operation the washer 20 will also be firmly seated against the end of the valve casing thus making a second tight joint. With this construction, therefore, the valve is closed positively in two places, once between the valve 7 and valve seat 6 and again between the end of the cap and the valve casing.

It has been stated above that the walls of the recess in the valve 7 were bevelled to make a flaring opening or mouth to the recess. The valve seat member 5 is provided with a correspondingly tapered portion which is adapted to fit into the flaring mouth 27 when the valve is drawn tightly to its seat as shown in Fig. 1. This flaring mouth 27 is formed in the metal part of the valve 7, and hence the tapered portion of the valve seat member and the flaring walls 27 form a metal-to-metal contact. When the cap 18 is turned to seat the valve 7 positively, said valve will be drawn toward the valve seat member until the tapered or conical portion of the said valve seat member engages the conical face 27 of the valve. This engagement, however, will not occur until after the valve seat 6 has become somewhat embedded in the resilient washer 13. The engagement of the conical portion of the valve seat member with the flaring walls 27 provides a stop which limits the extent to which the valve seat 6 can be forced into the resilient washer 13, and thus said washer is prevented from becoming crushed or injured by undue pressure. This metal-to-metal engagement of the valve seat member and the walls 27 provides also an additional closure so that when the valve is closed there are three places where the air passage is shut off, one between the valve seat 6 and the washer 13, another between the conical portion of the valve seat member and the wall 27, and a third between the cap 18 and the end of the valve stem.

An advantage resulting from the conical shape of the valve seat member and the flaring wall 27 is that the metal-to-metal surfaces are self-cleaning and provide an extremely tight joint.

The cap is provided with a projection 32 of the same shape as the interior of the sleeve 9 and having a bore 33 adapted to pass over the end of the valve stem. This projection forms the usual wrench by which the valve structure may be removed from and replaced in the casing.

The upper end of the valve casing is screw threaded exteriorly at 28 and may be of standard size but if the diameter of the valve casing required for a particular embodiment of the present invention is too large to fit the standard connections to the ordinary inflating pumps or valves, the cap 18 may be so constructed as to form an adapter to make connection from the tire casing to the standard connections of the inflating apparatus. For this purpose the cap 18 is shown as provided with a transverse bore 29 terminating at one end in a section interiorly screw threaded at 300 to fit upon the screw-threaded section 28 of the valve casing and exteriorly screw-threaded at 31 to fit into the standard connection of the inflating apparatus. Accordingly, when the cap 18 is removed to permit inflation of the tire it may be placed upon the valve casing, as shown in Fig. 4, with the bore 29 communicating with the bore of the sleeve 9 and with the screw-threaded section 31 in position to be connected to the inflating apparatus.

To facilitate the connection of the valve casing 1 to the inner tube 2 the valve casing at its inner end is formed with a flange 23 of special shape having on one side an elongation or nose-like extension 24. This construction facilitates the insertion of the flange 23 through the opening in the tube 2 because the nose 24, being narrow and pointed, may be easily entered into the opening and thus the flange forced through the opening. The inner tube is clamped against the flange by a clamping washer 25 of relatively large size which has the proper shape. A nut 26 screwed onto the valve casing serves to lock the clamping washer 25 firmly against the outer tube.

The opening through the rim is closed by a member comprising a metal shell 34 having a rubber lining 35, the latter having a hole therein of a size to fit the valve casing 1. The metal shell 34 is split at its outer end into a plurality of sections and is provided with a plurality of inwardly-directed flanges 36 which are adapted to engage the exterior screw-threads of the valve casing. The rubber member 35 is also split at its outer end. The metal shell 34 is tapered as shown and is provided with ribs 37. Surrounding the metal casing is a sleeve 38 by which the device can be applied to or removed from the valve casing and by which it is locked in place. This sleeve is provided with a head portion 39 forming a finger portion which may be readily grasped and it is also provided with an internal rib 40 which co-operates with the projections 37.

In applying the device it is slipped over the valve casing 1 until it rests against the rim and then pressure is applied on the head 39, this pressure forcing the head down on the casing 34 and causing the rib 40 to cam over the projections 37. This causes the split sections of the metal shell to be contracted radially and brings the projecting flanges 36 into interlocking engagement with the exterior threads of the valve casing thus locking the device in place. A pulling movement on the head 39 will release the interlocking connection and permit the removal of the device. In this movement the shoulder 41 of the casing will engage the outer portions 42 of the flanges 36 and the lugs 43 struck down from the casing and embedded in the rubber 35 will enable all the parts to be removed together.

An important feature of the invention resides in the plurality of closing or sealing points which are provided to prevent the escape of air from the tire. When the sleeve 9 is screwed into the valve casing a tight joint is formed between the washer 11 and the shoulder 8 to guard the escape of air between the valve casing and the sleeve. When the cap 18 is in place the washer 20 pressed against the end of the valve casing forms a second closure preventing the escape of air from between the sleeve and the valve casing. The escape of air through the valve is prevented at two further points as already explained, first, between the valve and valve seat where the resilient washer 13 is located, and again between the upper end of the opening through the sleeve 9 and the resilient washer 20. Thus when the cap is in place there is a double lock against the escape of air both around the sleeve and through the sleeve and when the cap is removed there is still one lock preventing the passage of air around the sleeve and another preventing the passage of air through the sleeve.

I claim:

In a tire valve, the combination with a valve casing having an interior shoulder, of a valve seat member within said casing resting on said shoulder, a clamping sleeve having a square bore screw threaded into the casing and clamping the valve seat member against the shoulder, said valve seat member extending inwardly beyond the shoulder and said extension being provided with a conical metal portion and a metal valve seat at its extremity, said valve seat member also having an opening axially therethrough, a metal valve member within the casing, said valve member having a recess in its outer end, the mouth of the recess being flaring to present bevelled walls corresponding to the conical shape of the valve seat member, a washer of resilient material in the bottom of the recess, a valve stem extending from the valve outwardly through the valve seat member, said valve stem having rigid therewith a square collar which fits the square bore of the clamping sleeve and is provided with grooves to form air passages, and a cap engaging the end of the valve casing and having screw-threaded engagement with the valve stem, whereby when the cap is turned to positively seat the valve the latter will be held from turning by the square collar and will be centered by the engagement of the conical bevel face of the recess with the conical portion of the valve seat member, and such engagement will prevent the valve seat from applying injurious pressure to the resilient washer.

In testimony whereof, I have signed my name to this specification.

WALTER E. COPITHORN.